United States Patent
Huo et al.

(10) Patent No.: US 8,095,714 B2
(45) Date of Patent: Jan. 10, 2012

(54) ELECTRONIC DEVICE CAPABLE OF AUTOMATICALLY SWITCHING BETWEEN A MASTER MODE AND A SLAVE MODE

(75) Inventors: Wei Huo, Shenzhen (CN); Zhong-Wei Du, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 233 days.

(21) Appl. No.: 12/699,899

(22) Filed: Feb. 4, 2010

(65) Prior Publication Data

US 2011/0029703 A1 Feb. 3, 2011

(30) Foreign Application Priority Data

Jul. 29, 2009 (CN) .......................... 2009 1 0304969

(51) Int. Cl.
G06F 13/00 (2006.01)
(52) U.S. Cl. .......................................... 710/110; 710/8
(58) Field of Classification Search ................ 710/8, 18, 710/106, 110
See application file for complete search history.

(56) References Cited

U.S. PATENT DOCUMENTS

| | | | |
|---|---|---|---|
| 2008/0263245 A1* | 10/2008 | Hsieh ............................ | 710/106 |
| 2010/0161842 A1* | 6/2010 | Shan et al. ...................... | 710/18 |

* cited by examiner

*Primary Examiner* — Clifford Knoll
(74) *Attorney, Agent, or Firm* — Altis Law Group, Inc.

(57) ABSTRACT

An electronic device, includes a USB interface, a processing unit, a master-slave select triggering circuit, a controlling unit, a selection circuit and a switching circuit. The master-slave selection triggering circuit including an input port, a first output port and a second output port. The master-slave select triggering circuit is used to detect the type of external electronic devices connected to the USB interface, if the external electronic device is a master device, the first and second output port output a slave triggering signal, the controlling unit switches off the switching circuit t and the selection circuit selects the processing unit into slave mode; if the external electronic device is the slave device, the first and second output port output a master triggering signal, the controlling unit switches on the switching circuit and the selection circuit select the processing unit into master mode.

7 Claims, 2 Drawing Sheets

ELECTRONIC DEVICE CAPABLE OF AUTOMATICALLY SWITCHING BETWEEN A MASTER MODE AND A SLAVE MODE

BACKGROUND

1. Technical Field

The present disclosure relates to electronic devices and, particularly, to an electronic device capable of automatically switching between a master and a slave mode.

2. Description of Related Art

In general, an electronic device has at least two control modes, for example, a master mode and a slave mode. When the electronic device, such as digital photo frame (DPF), is connected with a computer, the electronic device enters the slave mode, in which the DPF is controlled by the computer; when the DFP is connected with a memory device, such as a flash memory, the DPF enters the master mode, in which the DPF controls the flash memory. There is a need to change the control mode when the DPF connects to different external device.

However, a present switching circuit of the electronic device to switch between the master mode and the slave mode usually is relatively complex and has a high cost.

Therefore, an electronic device capable of automatically switching between a master mode and a slave mode is desired to overcome the above-described deficiencies.

BRIEF DESCRIPTION OF THE DRAWINGS

The components in the drawings are not necessarily drawn to scale, the emphasis instead being placed upon clearly illustrating the principles of the electronic device. Moreover, in the drawings, like reference numerals designate corresponding parts throughout the several views

DETAILED DESCRIPTION

Figure 1:
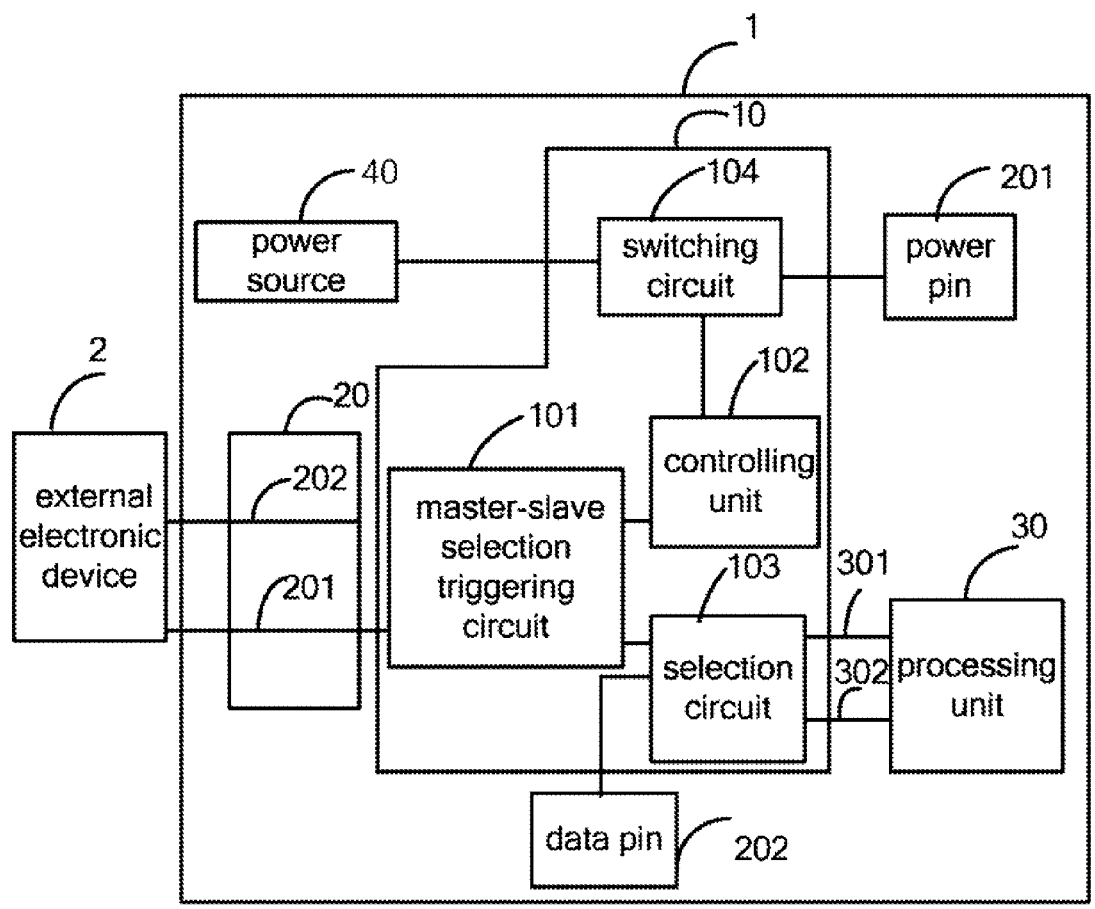
FIG. 1 is a block diagram of an electronic device capable of automatically switching between a master mode and a slave mode.

FIG. 1 is a block diagram of an electronic device capable of automatically selecting between a master mode and a slave mode. The electronic device 1 includes a mode switching circuit 10 and a USB interface 20. The USB interface 20 is used for connecting an external electronic device 2, and the mode switching circuit 10 is used for detecting the type of the external electronic device 2 and switching the electronic device 1 to the master mode or the slave mode according to the detected type of the external electronic device 2. For example, the mode switching circuit 10 switches the electronic device 1 to the slave mode, when the external electronic device 2 is a host device, such as a computer. When the external device 2 is a slave device, such as a flash memory, the switching circuit 10 switches the electronic device 1 to the master mode.

The mode switching circuit 10 includes a master-slave selection triggering circuit 101, a controlling unit 102, a selection circuit 103, and a switching circuit 104. The master-slave selection triggering circuit 101 includes an input port 1011, a first output port 1012, and a second output port 1013. The USB interface 20 includes a power pin 201 and a data pin 202. The input port 1011 of the master-slave selection triggering circuit 101, is connected to the power pin 201 of the USB interface 20. The first output port 1012 of the master-slave selection triggering circuit 101, is connected to the controlling unit 102, and the second output port 1013 of the master-slave selection triggering circuit 101, which is connected to the selection circuit 103.

The electronic device 1 also includes a processing unit 30 and a power source 40. The processing unit 30 includes a slave mode controlling pin 301 and a master mode controlling pin 302.

When the external electronic device 2 connects to the USB interface 20, the master-slave selection triggering circuit 101 determines the type of external electronic devices 2 by detecting the voltage of the power pin 201 of the USB interface 20. When the master-slave selection triggering circuit 101 detects the power pin 201 is at high voltage. The master-slave selection triggering circuit 101 determines the external electronic device 2 is a host device and sends a slave triggering signal to the controlling unit 102 and the selection circuit 103 via the first output port 1012 and the second output port 1013 respectively. When the master-slave selection triggering circuit 101 detects the power pin 201 is at low voltage, the master-slave selection triggering circuit 101 determines the external electronic device 2 is a slave device. Then the master-slave selection triggering circuit 101 sends a master triggering signal to the controlling unit 102 and the selection circuit 103 via the first output port 1012 and the second output port 1013 respectively.

The controlling unit 102 is further connected to the switching circuit 104, and the switching circuit 104 is connected between the power source 40 and the power pin 201. When the controlling unit 102 receives the slave triggering signal from the first output port 1012, the controlling unit 102 switches off the switching circuit 104, then disconnects the connection between the power source 40 and the power pin 201. When the selection circuit 103 receives the slave triggering signal from the second output port 1013, the selection circuit 103 connects the slave mode controlling pin 301 of the processing unit 30 with the data pin 202. Therefore, the electronic device 1 works in the slave mode.

When the controlling unit 102 receives the master triggering signal from the first output port 1012, the controlling unit 102 switches on the switching circuit 104, then the power source 40 is electrically connects to the power pin 201 via the switching circuit 104 and provides power to the power pin 201. When the selection circuit 103 receives the master triggering signal from the second output port 1013, the selection circuit 103 connects the master mode controlling pin 302 of the processing unit 30 with the data pin 202. Therefore, the electronic device 1 works in the master mode.

Therefore, when the external electronic device 2 is a host device, such as a computer, the controlling unit 102 of the electronic devices 1 switches off the switching circuit 104 to disconnect the connection between the power source 40 and the power pin 201. At the same time, the selection circuit 103 of the electronic device 1 connects the slave mode controlling pin 301 with the data pin 20, then the electronic device 1 is switched to the slave mode. When the external electronic device 2 is a slave device, the controlling unit 102 of the electronic devices 1 switches on the switching circuit 104 to connect the power source 40 with the power pin 201, and the power source 40 provides power to the power pin 201. At the same time, the selection circuit 103 of the electronic device 1 connects the master mode controlling pin 302 with the data pin 20, then the electronic device 1 is switched to the master mode.

Figure 2:
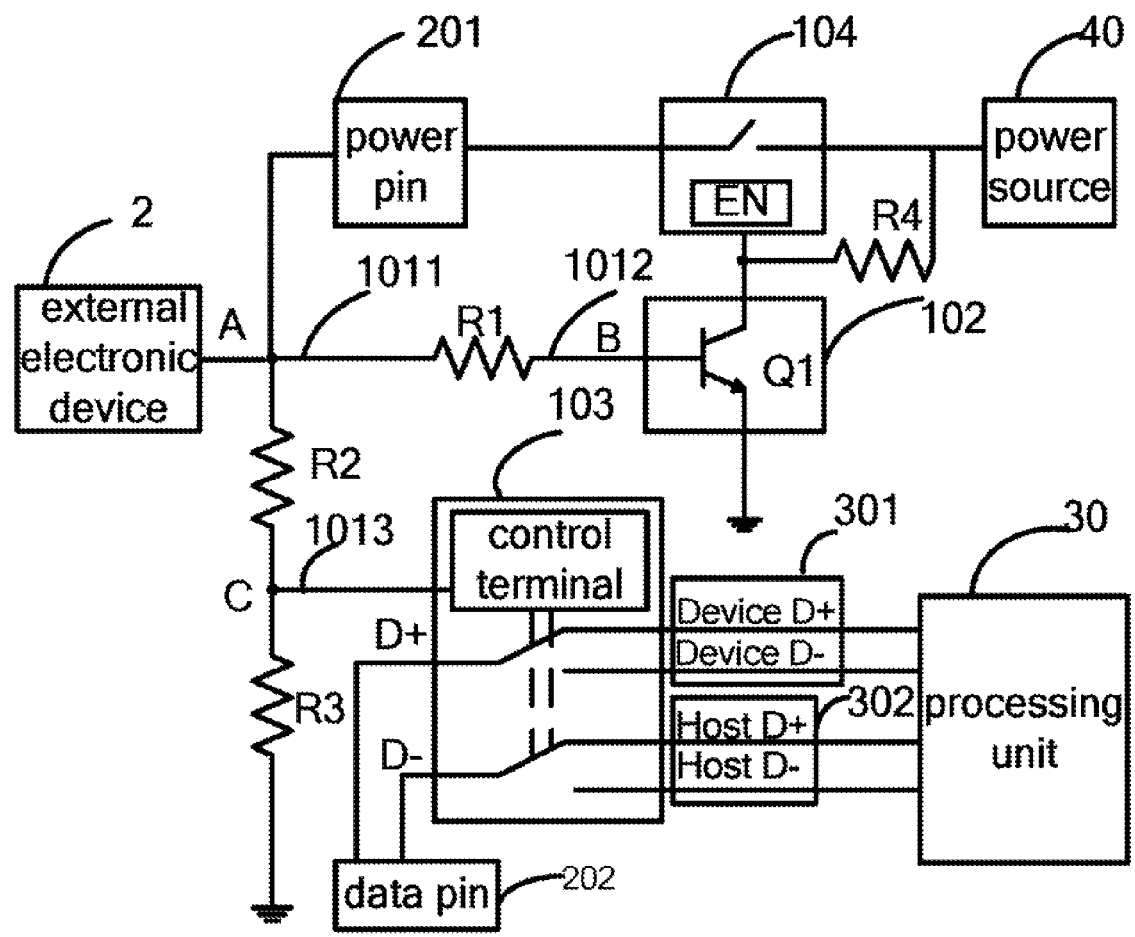
FIG. 2 is a circuit diagram of an electronic device capable of automatically switching between a master mode and a slave mode of FIG. 1.

FIG. 2 is a circuit diagram of the electronic device of FIG. 1. The master-slave selection triggering circuit $101_{[Zi]}$ includes a first resistor R1, a second resistor R2, and a third resistor R3. Referring to FIG. 2, a connection node A between the first resistor R1 and the second resistor R2 serves as the input port 1011 of the master-slave selection triggering circuit 101. A node B between the resistor R1 and the controlling unit 102 serves as the output port 1012 of the master-slave selection triggering circuit 101, and a connection node C between the first resistor R2 and the second resistor R3 serves as the output port 1013 of the master-slave selection triggering circuit 101.

The controlling unit 102 is a high voltage activated switch, and the controlling unit 102 includes a control terminal, a first conductive terminal, and a second conductive terminal. The exemplary embodiment, takes a negative-positive-negative (NPN) bipolar junction transistor (BJT) Q1 as an example to illustrate the controlling unit 102. A base, an emitter, and a collector of the NPN BJT Q1 serve as the control terminal, the first conductive terminal, and the second conductive terminal of the controlling unit 102 respectively.

The base of the NPN BJT Q1 is connected to the first output port 1012 of the master-slave selection triggering circuit 101, the collector of the NPN BJT Q1 is connected to the switching circuit 104, and the emitter of the NPN BJT Q1 is connected to ground.

The switching circuit 104 is a high voltage activated circuit, and the switching circuit 104 includes a control terminal, a first conductive terminal, and a second conductive terminal. The control terminal of the switching circuit 104 is connected to the collector of the NPN BJT Q1, the first conductive terminal is connected to the power source 40, and the second conductive terminal is connected to the power pin 201. In the exemplary embodiment, the switching circuit 104 is a high voltage activated switch, such as an n-channel metal-oxide-semiconductor field-effect transistor (NMOSFET) or a NPN BJT.

In the exemplary embodiment, the slave mode controlling pin 301 of a processing unit 30 includes a "Device D+" pin and a "Device D−" pin, the master mode controlling pin 302 of a processing unit 30 includes a "Host D+" pin and a "Host D−" pin. The data pin 202 of the USB interface 20 includes a first data pin (D+ pin) and a second data pin (D− pin).

The selection circuit 103 is a double-pole double-throw switch, which includes a control terminal, two public terminals, and four joint terminals. The control terminal of the selection circuit 103 is connected to the second output port 1013 of the master-slave selection triggering circuit 101. The two public terminals of the selection circuit 103 are respectively connected to the first data pin and the second data pin of the data pin 202. The four joint terminals of the selection circuit 103 are respectively connected to the "Device D+" pin, "Device D−" pin, "Host D+" pin, "Host D−" pin. When the control terminal of the selection circuit 103 is at high voltage, the two public terminals are connected to the joint terminals, which are connected to the "Device D+" pin, "Device D−" pin. When the control terminal of the selection circuit 103 is at low voltage, the two public terminals are connected to the joint terminals, which are connected to the "Host D+" pin, "Host D−" pin.

When the external electronic device 2 connected to the electronic device 1 is the host device, the power pin 201 of the USB interface 20 receives a high voltage from the external device 2, and the input port 1011 receives a high voltage from the USB interface 20 accordingly. The output port 1012 receives a high voltage from the input port 1011 via resistor R1, and the control terminal of the NPN BJT Q1 receives a high voltage from the first output port 1012, thereby causing the NPN BJT Q1 to be switched on. The control terminal of the switching circuit 104 receives a low voltage from the NPN BJT Q1, the switching circuit 104 is switched off accordingly, and the connection between the power source 40 and the power pin 201 of the USB interface 20 is disconnected.

When the input port 1011 receives a high voltage from the USB interface 20, the second output 1013 receives a high voltage divided by resistor R2 and resistor R3, then the second output 1013 outputs a high voltage slave triggering signal to the selection circuit 103. The selection circuit 103 connects the "Device D+" pin and "Device D−" pin to the first data pin and second data pin of the USB interface 20 by connecting the two public terminals to the joint ends connected to the "Device D+" pin, "Device D−" pin.

Therefore, the power supply of the USB interface 20 is from the external electronic device 2, and the electronic device 1 is switched to the slave mode.

When the external electronic device 2 connected to the electronic device 1 is the slave device, the power pin 201 of the USB interface 20 receives a low voltage from the external device 2, and the input port 1011 receives a low voltage from the power pin 201 accordingly. The output port 1012 receives a low voltage from the input port 1011 via resistor R1, the control terminal of the NPN BJT Q1 receives a low voltage from the output port 1012, and the NPN BJT Q1 is switched off. The control terminal of the switching circuit 104 receives a high voltage from the NPN transistor Q1, the switching circuit 104 is switched on, and the power source 40 is connected to the power pin 201 of the USB interface 20.

When the input port 1011 receives a low voltage from the USB interface 20, the second output 1013 receives a low voltage divided by resistor R2 and resistor R3 then the second output 1013 outputs a low voltage master triggering signal to the selection circuit 103. The selection circuit 103 connects the "Device D+" pin and "Device D−" pin separately to the first data pin and second pin of the USB interface 20 by connecting the two public terminals to the joint ends connected to the "Host D+" pin, "Host D−" pin.

Therefore, the power supply of the USB interface 20 is from the electronic device 1, and the electronic device 1 is switched to the master mode.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the present disclosure.

What is claimed is:

1. An electronic device capable of automatically switching between a master mode and a slave mode, comprising:
   a USB interface comprising a power pin and a date pin;
   a power source;
   a switching circuit connected between the power source and the power pin of the USB interface;
   a controlling unit connected to the switching circuit;
   a selection unit;
   a master-slave selection triggering circuit comprising an input port connected to the power pin of the USB interface, a first output port connected to the controlling unit, and a second output port connected to the selection unit, which configured for detecting the voltage of the power pin of the USB interface and sending corresponding signals to the controlling unit and the selection unit via the first output port and the second output port respectively;
   wherein, when the master-slave selection triggering circuit detects the power pin is at high voltage, the master-slave selection triggering circuit sends a slave triggering signal to the controlling unit and the selection circuit respectively via the first output port and the second output port, when the master-slave selection triggering circuit detects the power pin is at low voltage, the master-slave selection triggering circuit sends a master triggering signal to the controlling unit and the selection circuit respectively via the first output port and the second output port;

when the controlling unit receives the slave triggering signal from the first output port, the controlling unit switches off the switching circuit, then disconnects the connection between the power source and the power pin, when the selection circuit receives the slave triggering signal from the second output port, the selection circuit connects the slave mode controlling pin of the processing unit with the data pin;

when the controlling unit receives the master triggering signal from the first output port, the controlling unit switches on the switching circuit, then the power source is electrically connects to the power pin and provides power to the power pin; when the selection circuit receives the master triggering signal from the second output port, the selection circuit connects the master mode controlling pin of the processing unit with the data pin.

2. The electronic device capable of automatically switching between a master mode and a slave mode of claim 1, wherein the master-slave selection triggering circuit comprises a first resistor, a second resistor, and a third resistor, a connection node between the first resistor and the second resistor serves as the input port of the master-slave selection triggering circuit, a connection node between the first resistor and the controlling unit serves as the output port of the master-slave selection triggering circuit, and a connection node between the first resistor and the second resistor serves as the output port of the master-slave selection triggering circuit.

3. The electronic device capable of automatically switching between a master mode and a slave mode of claim 2, wherein the controlling unit is a high voltage activated switch, the controlling unit comprises a control terminal, a first conductive terminal, and a second conductive terminal, the control terminal is connected to the first output port, the first conductive terminal is connected to ground, and the second conductive terminal is connected to the switching circuit.

4. The electronic device capable of automatically switching between a master mode and a slave mode of claim 3, wherein the switching circuit is a high voltage activated switch, which comprises a control terminal, a first conductive terminal, and a second conductive terminal, the control terminal of the switching circuit is connected to the second conductive terminal of the controlling unit, the first conductive terminal is connected to the power source, and the second conductive terminal is connected to the power pin.

5. The electronic device capable of automatically switching between a master mode and a slave mode of claim 4, wherein when the power pin of the USB interface receives a high voltage from an external device, the input port receives a high voltage from the USB interface, the output port receives a high voltage from the input port via the first resistor, the controlling terminal of the controlling unit receives a high voltage from the first output port, and the controlling unit is switched on; when the power pin of the USB interface receives a low voltage from the external device, the input port receives a low voltage from the USB interface, the first output port receives a low voltage from the input port via the first resistor, the controlling terminal of the controlling unit receives a low voltage from the first output port, and the controlling unit is switched off.

6. The electronic device capable of automatically switching between a master mode and a slave mode of claim 2, wherein the selection circuit is a double-pole double-throw switch, which comprises a control terminal, the control terminal is connected to the second output port of the master-slave selection triggering circuit, when the selection circuit receives the slave triggering signal from the second output port, the selection circuit connects the slave mode controlling pin with the data pin, when the selection circuit receives the master triggering signal from the second output port, the selection circuit connects the master mode controlling pin with the data pin.

7. The electronic device capable of automatically switching between a master and a slave mode of claim 6, wherein when the master mode controlling pin connects to the data pin, the electronic device is switched to the master mode, when the slave mode controlling pin connects to the data pin, the electronic device is switched to the slave mode.

* * * * *